(12) United States Patent
Ajitomi et al.

(10) Patent No.: US 9,686,361 B2
(45) Date of Patent: Jun. 20, 2017

(54) COMMUNICATION DEVICE, COMMUNICATION SYSTEM, COMMUNICATION METHOD AND COMPUTER PROGRAM PRODUCT

(71) Applicant: Kabushiki Kaisha Toshiba, Minato-ku (JP)

(72) Inventors: Daisuke Ajitomi, Setagaya (JP); Keisuke Minami, Kawasaki (JP); Hiroshi Kawazoe, Kawasaki (JP); Hiroyuki Aizu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 139 days.

(21) Appl. No.: 14/636,351

(22) Filed: Mar. 3, 2015

(65) Prior Publication Data

US 2015/0256626 A1 Sep. 10, 2015

(30) Foreign Application Priority Data

Mar. 5, 2014 (JP) .................. 2014-043195

(51) Int. Cl.
*H04L 29/08* (2006.01)
*H04L 12/741* (2013.01)

(52) U.S. Cl.
CPC .......... *H04L 67/141* (2013.01); *H04L 45/74* (2013.01)

(58) Field of Classification Search
None
See application file for complete search history.

(56) References Cited

U.S. PATENT DOCUMENTS

2009/0180493 A1* 7/2009 Hirano .................. H04L 12/185
370/464

2014/0052775 A1* 2/2014 Koo ...................... H04W 8/245
709/203
2014/0297878 A1 10/2014 Minami et al.

FOREIGN PATENT DOCUMENTS

JP 2013-211766 10/2013
JP 2014-199998 10/2014

OTHER PUBLICATIONS

"WebSocket", Nikkei Electronics, No. 1108, May 13, 2013, pp. 71-79 and English Abstract.

* cited by examiner

*Primary Examiner* — Azizul Choudhury
(74) *Attorney, Agent, or Firm* — Oblon, McClelland, Maier & Neustadt, L.L.P.

(57) ABSTRACT

According to an embodiment, a communication device includes a connection establishment unit, a forwarder, and a generator. The connection establishment unit is configured to receive, from a terminal device, a connection request containing identification information of the terminal device, establish a communication connection with the terminal device, and store the identification information and terminal connection information. The forwarder is configured to receive, from a first terminal device, a message to be transmitted from the first terminal device to a second terminal device, and forward the message to the second terminal device, based on forwarding information containing the terminal connection information corresponding to the identification information of the first terminal device, and the terminal connection information corresponding to the identification information of the second terminal device. The generator is configured to generate the forwarding information, based on a request from the forwarder or the connection establishment unit.

9 Claims, 8 Drawing Sheets

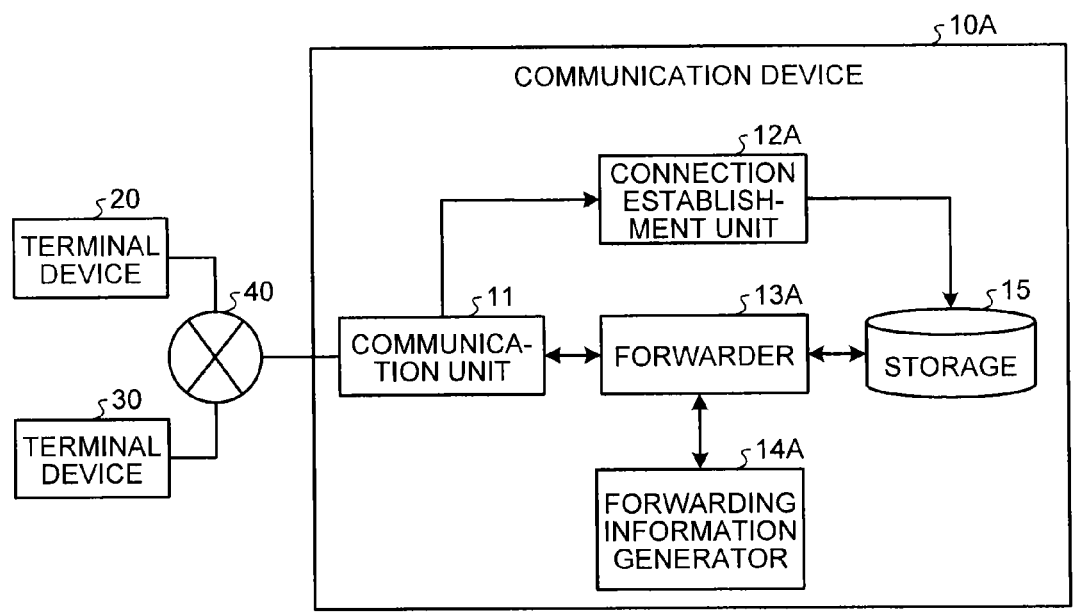

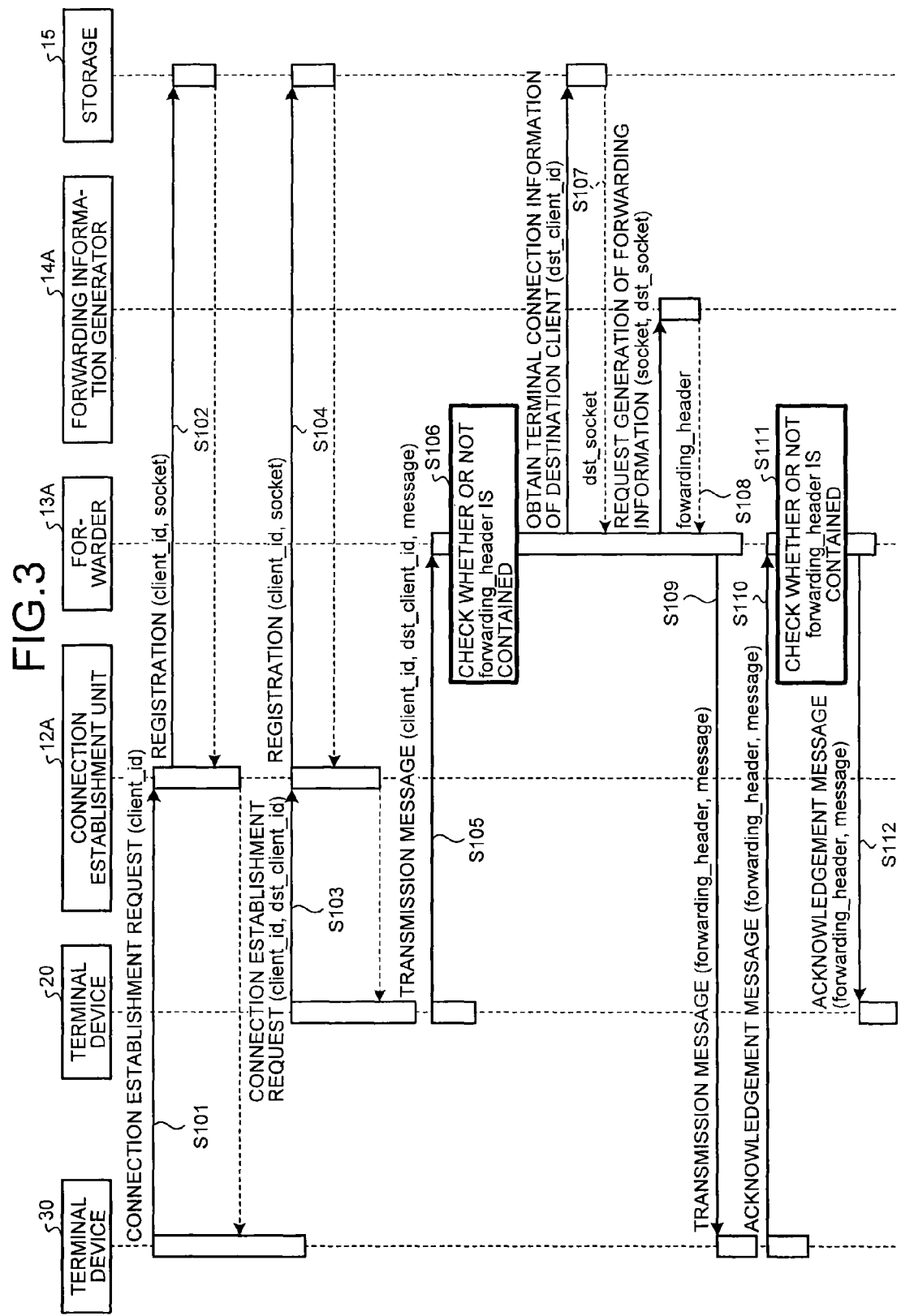

FIG.4A

| Websocket HEADER (2 bytes) | FORWARDING INFORMATION TYPE (1 byte) | FORWARDING INFORMATION OR DESTINATION CLIENT INFORMATION (16 bytes) | MES-SAGE BODY |
|---|---|---|---|

FIG.4B

DESTINATION CLIENT INFORMATION

| Websocket HEADER (2 bytes) | 0x01: TRANSMISSION MESSAGE WITHOUT FORWARDING INFORMATION (1 byte) | client_id: TERMINAL IDENTIFICATION INFORMATION OF SMART PHONE (8 bytes) | dst_client_id: TERMINAL IDENTIFICATION INFORMATION OF DIGITAL TV SET (8 bytes) | MES-SAGE BODY |
|---|---|---|---|---|

FIG.4C forwarding_header: FORWARDING INFORMATION

| Websocket HEADER (2 bytes) | 0x02: TRANSMISSION MESSAGE WITH FORWARDING INFORMATION (1 byte) | socket: TERMINAL CONNECTION INFORMATION OF SMART PHONE (8 bytes) | dst_socket: TERMINAL CONNECTION INFORMATION OF DIGITAL TV SET (8 bytes) | MES-SAGE BODY |
|---|---|---|---|---|

FIG.4D forwarding_header: FORWARDING INFORMATION

| Websocket HEADER (2 bytes) | 0x03: TRANSMISSION MESSAGE WITH FORWARDING INFORMATION (1 byte) | socket: TERMINAL CONNECTION INFORMATION OF SMART PHONE (8 bytes) | dst_socket: TERMINAL CONNECTION INFORMATION OF DIGITAL TV SET (8 bytes) | MES-SAGE BODY |
|---|---|---|---|---|

| ENTRY NO. | TERMINAL IDENTIFICATION INFORMATION | COMMUNICATION DEVICE IDENTIFICATION INFORMATION | GROUP IDENTIFICATION INFORMATION | ATTRIBUTE INFORMATION |
|---|---|---|---|---|
| 001 | AAA | XXX | 123 | SMART PHONE |
| 002 | BBB | XXX | 123 | DIGITAL TV SET |
| 003 | CCC | YYY | 456 | SMART PHONE |
| ⋮ | ⋮ | ⋮ | ⋮ | ⋮ |

T2

COMMUNICATION DEVICE, COMMUNICATION SYSTEM, COMMUNICATION METHOD AND COMPUTER PROGRAM PRODUCT

CROSS-REFERENCE TO RELATED APPLICATION

This application is based upon and claims the benefit of priority from Japanese Patent Application No. 2014-043195, filed on Mar. 5, 2014; the entire contents of which are incorporated herein by reference.

FIELD

Embodiments described herein relate generally to a communication device, a communication system, a communication method and a computer program product.

BACKGROUND

WebSocket has been known as a Web-standard communication protocol that maintains an established communication connection thereby to eliminate the reconnection cost and achieve the reduction of delay. WebSocket is utilized in, for example, an application such as so-called smart remote control that transmits a control command from a terminal such as a smart phone to an apparatus connected to a network via a server thereby to control the apparatus. Since real-time properties are strongly required in such an application, it is demanded that the delay when a server forwards a message (such as a control command) from a terminal to an apparatus be reduced as much as possible.

BRIEF DESCRIPTION OF THE DRAWINGS

FIG. 1 is a configuration diagram illustrating a communication device according to a first embodiment;

FIG. 2 is a conceptual diagram illustrating an example of a connection management table;

FIG. 3 is a sequence diagram illustrating an action of a communication device according to the first embodiment;

FIGS. 4A to 4D are each a conceptual diagram illustrating an example of a data format of a message;

DETAILED DESCRIPTION

Figure 5:
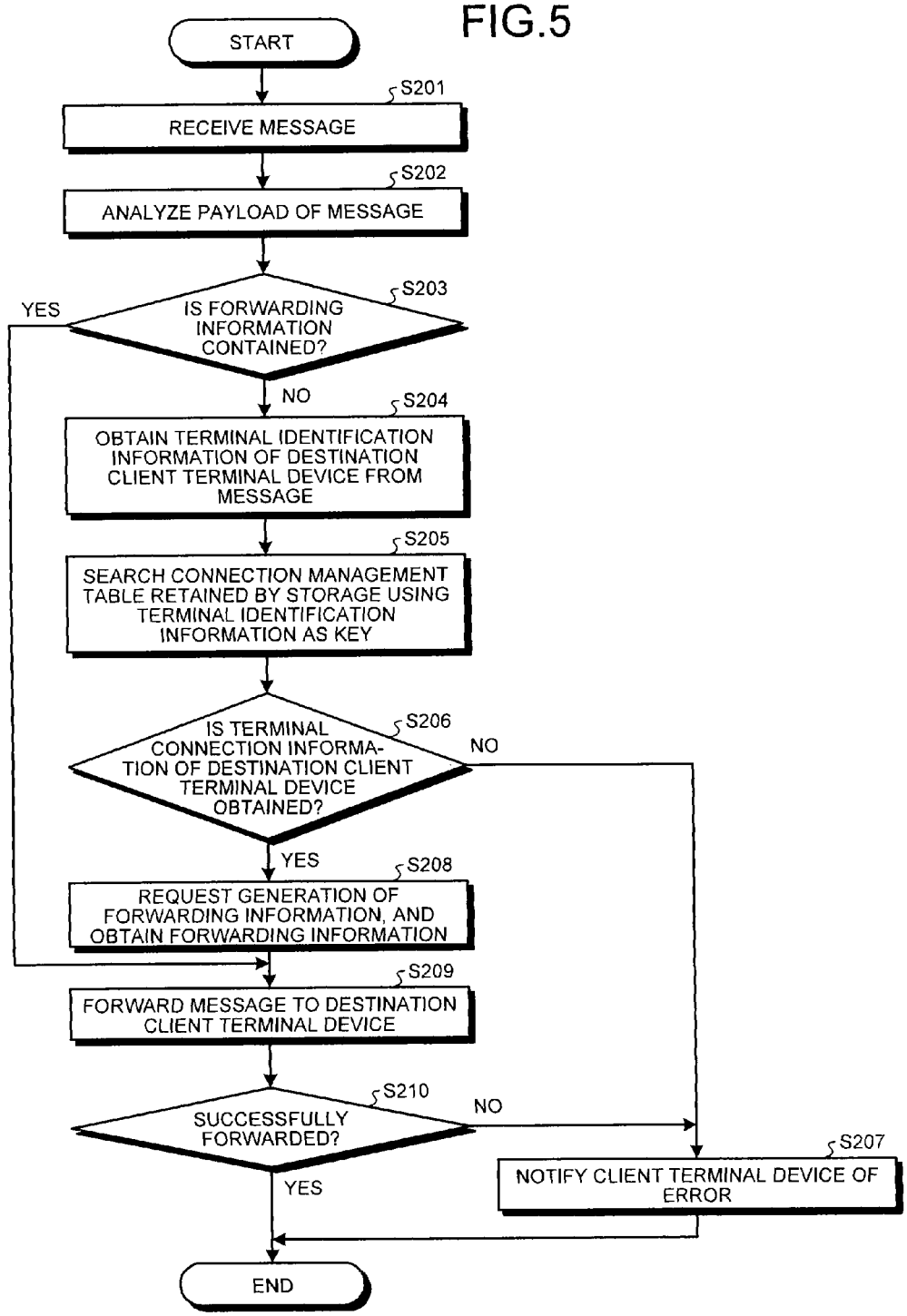
FIG. 5 is a flow chart illustrating a processing procedure of a forwarder.

According to an embodiment, a communication device communicates with a terminal device via a network and includes a connection establishment unit, a forwarder, and a forwarding information generator. The connection establishment unit is configured to receive, from the terminal device, a connection establishment request containing at least terminal identification information of the terminal device, establish a communication connection with the terminal device, and store the terminal identification information contained in the connection establishment request and terminal connection information indicating the communication connection established with the terminal device so that the terminal identification information and the terminal connection information are associated with each other. The forwarder is configured to receive, from a first terminal device, a message to be transmitted from the first terminal device to a second terminal device, and forward the message containing forwarding information to the second terminal device, based on the forwarding information containing the terminal connection information corresponding to the terminal identification information of the first terminal device, and the terminal connection information corresponding to the terminal identification information of the second terminal device. The forwarding information generator is configured to generate the forwarding information, based on a request from the forwarder or the connection establishment unit.

First Embodiment

FIG. 1 is a configuration diagram illustrating a communication device 10A according to the first embodiment. The communication device 10A illustrated in FIG. 1 communicates with terminal devices 20 and 30 via a network 40, and forwards a message transmitted and received between the terminal device 20 and the terminal device 30. It is noted that although only two of the terminal devices 20 and 30 are indicated in FIG. 1 for convenience, the number of terminal devices is optional.

The communication device 10A is typically achieved as a server device including a hardware configuration as a general computer system (a CPU, a main storage, an auxiliary storage, and a communication interface). However, the communication device 10A may also be achieved as, for example, a digital apparatus such as a PC (personal computer), a digital TV set, a hard disk recorder, a slate PC and a smart phone. Also, the communication device 10A can take various structural variations (such as the configuration number of and the capacity of CPUs, main storages and auxiliary storages, and the connection interface standard). Furthermore, the communication device 10A may be achieved as a virtual machine that acts on a cloud system.

In the present embodiment, the communication device 10A is assumed to be a server device disposed on the Internet as the network 40.

The terminal devices 20 and 30 are each a terminal device that transmits and receives a message. Each of these terminal devices 20 and 30 is, for example, a digital apparatus such as a PC, an STB (set top box), a digital TV set, a hard disk recorder, a tablet terminal and a smart phone. However, each of the terminal devices 20 and 30 may be an apparatus in any form, as long as it has a function of communicating with the communication device 10A via the network 40. For example, each of the terminal devices 20 and 30 may be a relay device such as a broadband router, or an apparatus having a low data processing capacity like white goods and sensors.

In the present embodiment, it is assumed that a smart phone is used as the terminal device 20 while a digital TV set is used as the terminal device 30. Especially, an application of so-called smart remote control is assumed in which a control command is transmitted from a smart phone to a digital TV set as a message, to control the digital TV set in a real-time and low-delay manner.

Hereinafter, functional components of the communication device 10A will be specifically described. The communication device 10A includes, as illustrated in FIG. 1, a communication unit 11, a connection establishment unit 12A, a forwarder 13A, a forwarding information generator 14A, and a storage 15.

The communication unit 11 is a functional block that communicates with the terminal devices 20 and 30 via the network 40. Specifically, the communication unit 11 is, for example, a functional component that contains a TCP/IP communication stack from an NIC (Network Interface Card). The TCP/IP stack may be implemented as hardware on the NIC, or may be software implemented on an operating system (OS) or implemented as a driver. Also, the transport layer is not limited to the TCP, and may be, for example, the UDP. Also, the physical-MAC layer may be not only Ethernet (registered trademark), but also wireless links such as Wifi, InfiniBand and the like.

The connection establishment unit 12A receives a connection establishment request containing at least terminal identification information from the terminal devices 20 and 30, and establishes communication connection with the terminal devices 20 and 30 in response to this connection establishment request. Then, the connection establishment unit 12A stores, in the storage 15, the terminal identification information contained in the connection establishment request from the terminal devices 20 and 30 and the terminal connection information indicating the communication connection established with the terminal devices 20 and 30, in such a manner that both information are associated with each other. For example, the connection establishment unit 12A receives the connection establishment request containing the terminal identification information of the terminal device 20 from the terminal device 20, and then establishes communication connection with the terminal device 20. Thereafter, the connection establishment unit 12A registers a pair of the terminal identification information and the terminal connection information of the terminal device 20 in, for example, an entry of the later-described connection management table retained by the storage 15. Similarly, the connection establishment unit 12A receives a connection establishment request containing the terminal identification information of the terminal device 30 from the terminal device 30, and then establishes communication connection with the terminal device 30. Thereafter, the connection establishment unit 12A registers a pair of the terminal identification information and the terminal connection information of the terminal device 30 in, for example, an entry of the later-described connection management table retained by the storage 15.

The communication connections with the terminal devices 20 and 30 established by the connection establishment unit 12A are assumed to be a communication connection based on the TCP (Transmission Control Protocol). However, an applicable communication connection is not limited to this, as long as it is a communication protocol having a concept of connection or session. For example, a UDP communication session built by the SIP (Session Initiation Protocol) may be applied. Also, a cryptographic protocol utilized on the TCP such as the TLS and the SSL may be applied. In the present embodiment, the connection establishment unit 12A is assumed to establish a TCP or TLS connection utilizing the WebSocket protocol.

The terminal identification information is intrinsic identification information that is uniquely allocated to the terminal devices 20 and 30. The terminal identification information may be information for actually identifying the device itself of the terminal devices 20 and 30, or may be information for identifying the end point of the communication connection. In the former case, information previously embedded in the terminal devices 20 and 30, like a MAC address and a serial number of a product, may be used; or a unique ID capable of being also independently generated on the terminal devices 20 and 30, like the UUID (Universally Unique Identifier), may be used. Also, an original ID (including a UUID) generated and assigned by another component of the communication device 10A or a communication system including the communication device 10A when registering the terminal devices 20 and 30 may be used. Also, in the latter case, a pair of an IP address and a port number of each of the terminal devices 20 and 30 may be used; or an original client ID assigned by the communication system at granularity that is further finer than the device unit may be used. That is, the terminal identification information is not information that changes for each communication connection as in the case of the later-described terminal connection information, but is constant information that is allocated to the terminal devices 20 and 30 or to the application executed by the terminal devices 20 and 30.

The terminal connection information is information for identifying the communication connection with the terminal devices 20 and 30 established by the connection establishment unit 12A. Specifically, examples of the terminal connection information to be used may include a communication socket ID, and address (pointer) information indicating the storage location of the information regarding a communication socket. The former communication socket ID is specifically a file descriptor for allowing a file system of the communication device 10A to access a communication socket. The latter address (pointer) information is specifically a pointer to a socket buffer (an object that stores information regarding a communication socket such as a communication socket ID) in an OS (operating system) of the communication device 10A.

FIG. 2 is a conceptual diagram illustrating an example of a connection management table T1 retained by the storage 15. As illustrated in FIG. 2, the terminal identification information and the terminal connection information of the terminal devices 20 and 30, with which the communication device 10A establishes the communication connection, are stored in each entry of the connection management table T1 in such a manner as being associated with each other. The connection establishment unit 12A registers, as described above, a pair of the terminal identification information and the terminal connection information of the terminal devices 20 and 30 with which the communication connection is established, in the entry of this connection management table T1, whenever the communication connection with the terminal devices 20 and 30 is established. The information registered in the entry of the connection management table T1 is erased when the relevant communication connection is interrupted. Although the WebSocket protocol maintains the established communication connection, the communication connection is interrupted in response to an explicit operation of interrupting the communication connection. Also, in some cases, the communication connection is interrupted due to a certain factor in the network 40. In such a case, the connection establishment unit 12A detects the interruption of the communication connection, and then erases the relevant entry of the connection management table T1 retained by the storage 15.

The forwarder 13A receives a message transmitted from one of the terminal devices 20 and 30 to the other, and forwards the message including forwarding information to the destination client terminal device, based on the forwarding information containing the terminal connection information established with a client terminal device and the terminal connection information established with a destination client terminal device. At this time, the forwarder 13A checks whether or not the forwarding information is contained in the message received from the client terminal device. When the forwarding information is not contained in the relevant message, the forwarder 13A requests the forwarding information generator 14A to generate the forwarding information. Then, the forwarder 13A adds the forwarding information generated by the forwarding information generator 14A to the message received from the client terminal device, and forwards the added message to the destination client terminal device. On the other hand, when the forwarding information is contained in the message received from the client terminal device, the forwarder 13A forwards the message as it is, to the destination client terminal device.

The terminal connection information of the terminal devices 20 and 30 contained in the forwarding information is respectively associated with the terminal identification information of the terminal devices 20 and 30, and stored in the connection management table T1 retained by the storage 15.

The forwarding information generator 14A generates the above-described forwarding information containing the terminal connection information of each of the terminal devices 20 and 30 that transmit and receive the message, based on the request from the forwarder 13A. In the present embodiment, the forwarding information is assumed to be a combination of the terminal connection information of the client terminal device of a message and the terminal connection information of the destination client terminal device of the message. However, other than this, the forwarding information may contain, for example, the terminal identification information and the readable terminal name. The forwarding information generator 14A is called and generates the forwarding information when the forwarder 13A detects that the forwarding information is not contained in the message.

Next, by referring to FIG. 3, an action of the communication device 10A according to the first embodiment will be described. FIG. 3 is a sequence diagram illustrating an action of the communication device 10A according to the first embodiment. In the drawing, "client_id" indicates the terminal identification information; "socket" indicates the terminal connection information; and "forwarding_header" indicates the forwarding information. Also, "dst_" indicates a destination client. It is noted that in FIG. 2, an application of smart remote control is assumed in which a control command is transmitted from the terminal device 20 (a smart phone) to the terminal device 30 (a digital TV set) as a message.

First, a connection establishment request is transmitted from the terminal device 30 (a digital TV set) to the communication device 10A (step S101). This connection establishment request contains the terminal identification information (client_id) of the terminal device 30.

The connection establishment unit 12A of the communication device 10A receives the connection establishment request from the terminal device 30, establishes communication connection with the terminal device 30 in response to this connection establishment request, and registers a pair of the terminal identification information (client_id) contained in the connection establishment request and the terminal connection information (socket) indicating the communication connection established with the terminal device 30, to an entry of the connection management table T1 retained by the storage 15 (step S102).

Next, a connection establishment request is transmitted from the terminal device 20 (a smart phone) to the communication device 10A (step S103). This connection establishment request contains the terminal identification information (client_id) of the terminal device 20, and the terminal identification information (dst_client_id) of the terminal device 30 designated by the terminal device 20 as a client destination of a message.

It is noted that a conceivable method of obtaining the terminal identification information of the terminal device 30 (a digital TV set) that is designated as a client destination of a message by the terminal device 20 (a smart phone) is as below. For example, as a function of the communication system according to the present embodiment, information regarding a device owned by a user is managed; the device (in this case, the terminal device 30) owned by the same user is presented when the terminal device 20 is registered or requests a connection; and the communication system side (such as another function in the communication device 10A or another device in the communication system) notifies the terminal device 20 of the terminal identification information of this terminal device 30. Alternatively, it may be configured that the user of the terminal device 20 may manually set the terminal identification information of the terminal device 30 to the terminal device 20. Also, when connecting the terminal device 20 with a home LAN or the like, finding of and pairing with the terminal device 30 connected to the home LAN may be automatically executed, thereby to set the terminal identification information of the terminal device 30 to the terminal device 20.

The connection establishment unit 12A of the communication device 10A receives the connection establishment request from the terminal device 20, establishes the communication connection with the terminal device 20 in response to this connection establishment request, and registers a pair of the terminal identification information (client_id) of the terminal device 20 contained in the connection establishment request and the terminal connection information (socket) indicating the communication connection established with the terminal device 20, to the entry of the connection management table T1 retained by the storage 15 (step S104).

Next, a transmission message to the terminal device 30 is transmitted from the terminal device 20 to the communication device 10A (step S105). This transmission message is, for example, a control command for manipulating the terminal device 30 (a digital TV set) from the terminal device 20 (a smart phone) by an application of smart remote control.

An example of the data format of the message that is transmitted and received through WebSocket communication assumed in the present embodiment is illustrated in FIGS. 4A to 4D. The message transmitted and received between the terminal device 20 (a smart phone) and the terminal device 30 (a digital TV set) is constituted by, as illustrated in FIG. 4A, a 2-byte WebSocket header or the like, a 1-byte forwarding information type or the like, a 16-byte forwarding information or destination client information or the like, and a message body. The forwarding information type, the forwarding information or destination client information, and the message body correspond to the payload of a message. It is noted that in order to allow the data format of a message to have expandability, a version number may be contained in the payload. The forwarding information type indicates whether or not the forwarding information is contained in the payload of the relevant message, and the format of the forwarding information when contained. The destination client information is information stored in place of the forwarding information when the forwarding information is not contained, and contains the terminal identification information of the client terminal device of a message and the terminal identification information of the destination client terminal device.

The transmission message to the terminal device 30 transmitted from the terminal device 20 in step S105 does not contain, as illustrated in FIG. 4B, the forwarding information (forwarding_header), and instead contains the destination client information including a combination of the terminal identification information (client_id) of the client terminal device 20 (a smart phone) and the terminal identification information (dst_client_id) of the destination client terminal device 30 (a digital TV set).

In response to the receipt of the transmission message from the terminal device 20, the forwarder 13A of the communication device 10A checks whether or not the forwarding information (forwarding_header) is contained in the relevant message (step S106). Here, the forwarding information (forwarding_header) is not contained in the transmission message. Therefore, the forwarder 13A searches the entry of the connection management table T1 retained by the storage 15 using the terminal identification information (dst_client_id) of the destination client terminal device 30 contained in the transmission message as a key, and obtains the terminal connection information (dst_socket) corresponding to this terminal identification information (dst_client_id) (step S107). Then, the forwarder 13A delivers the terminal connection information (socket) of the client terminal device 20 and the terminal connection information (dst_socket) of the destination client terminal device 30 to the forwarding information generator 14A thereby to request generation of the forwarding information (forwarding_header), and receives the forwarding information (forwarding_header) generated by the forwarding information generator 14A in response to this request, from the forwarding information generator 14A (step S108). Then, the forwarder 13A adds the forwarding information (forwarding_header) generated by the forwarding information generator 14A to the transmission message received from the terminal device 20 in place of the destination client information, and forwards the added message to the destination client terminal device 30 (step S109).

It is noted that in the example illustrated in FIG. 3, the forwarder 13A obtains the terminal connection information (dst_socket) of the terminal device 30 from the storage 15 based on the terminal identification information (dst_client_id) of the destination client terminal device 30. However, it may be configured that the forwarding information generator 14A receives the terminal identification information (dst_client_id) of the terminal device 30 from the forwarder 13A, and obtains the terminal connection information (dst_socket) of the terminal device 30 from the storage 15 to generate the forwarding information (forwarding_header).

The transmission message forwarded to the terminal device 30 in step S109 contains, as illustrated in FIG. 4C, the forwarding information (forwarding_header) that includes a combination of the terminal connection information (socket) of the client terminal device 20 (a smart phone) and the terminal connection information (dst_socket) of the destination client terminal device 30 (a digital TV set), in place of the destination client information.

In response to the receipt of the transmission message transmitted from the terminal device 20 and forwarded by the communication device 10A, the terminal device 30 transmits an acknowledgment message (Ack message) to the communication device 10A (step S110). This acknowledgment message contains, as illustrated in FIG. 4D, the forwarding information (forwarding_header) of the transmission message in an unchanged form, with the forwarding information type changed. However, it may be configured that the forwarding information type is identical between the transmission message and the acknowledgment message, while the client and the destination client of the forwarding information are interchanged.

In response to the receipt of the acknowledgment message from the terminal device 30, the forwarder 13A of the communication device 10A checks whether or not the forwarding information (forwarding_header) is contained in the relevant message (step S111). Here, the forwarding information (forwarding_header) is contained in the acknowledgment message. Therefore, the forwarder 13A can forward the acknowledgment message to the terminal device 20, only by specifying the communication connection (communication socket) of the terminal device 20 that is the destination client of the acknowledgment message based on the forwarding information (forwarding_header) contained in the message, and then writing the acknowledgment message as it is to the specified communication connection (step S112).

As described above, the forwarding information (forwarding_header) is contained in the acknowledgment message from the terminal device 30 to the terminal device 20. Accordingly, the terminal device 20 having received this acknowledgment message can transmit the transmission message in a form of containing the forwarding information (forwarding_header) when transmitting the transmission message (control command) to the terminal device 30 thereafter. Therefore, unless the communication connection is interrupted, the forwarding information does not need to be newly generated.

It is noted that although it is configured in the example illustrated in FIG. 3 that the terminal device 30 (a digital TV set) having received the transmission message from the terminal device 20 (a smart phone) transmits the acknowledgment message (Ack message) in response to the transmission message, a configuration without the transmission of the acknowledgment message is also conceivable. In the case of this configuration, the terminal device 20 cannot transmit the transmission message containing the forwarding information, unless a certain message is transmitted from the terminal device 30. To address this concern, in the case of this configuration, at the stage where the forwarding information generator 14A of the communication device 10A generates the forwarding information, it is desirable that a mechanism of notifying the terminal device 20 of this forwarding information be provided.

FIG. 5 is a flow chart illustrating a processing procedure of the forwarder 13A in the communication device 10A according to the first embodiment.

In response to the receipt of a message to be forwarded (step S201), the forwarder 13A analyzes the payload of the received message (step S202) to determine whether or not the forwarding information is contained in the message (step S203). Then, when the forwarding information is not contained in the received message (step S203: No), the forwarder 13A obtains the terminal identification information of the destination client terminal device from the message (step S204), and searches the connection management table T1 retained by the storage 15 using this terminal identification information as a key (step S205).

At this time, in some cases, the communication connection between the destination client terminal device and the communication device 10A is not yet established, and the information regarding the destination client communication terminal is not registered in the entry of the connection management table T1. Also, in some cases, the once-established communication connection with the destination client terminal device is interrupted, causing the entry of the connection management table T1 to be deleted. To address these concerns, the forwarder 13A determines whether or not the terminal connection information of the destination client terminal device was able to be obtained by searching the connection management table T1 (step S206). Then, when the terminal connection information of the destination client terminal device cannot be obtained (step S206: No), the forwarder 13A notifies the terminal device that has transmitted the message, of an error indicating that the message was not able to be forwarded (step S207).

On the other hand, when the terminal connection information of the destination client terminal device was able to be obtained (step S206: Yes), the forwarder 13A delivers the terminal connection information of the client terminal device and the terminal connection information of the destination client terminal device to the forwarding information generator 14A to request generation of the forwarding information, and thus obtains the forwarding information generated by the forwarding information generator 14A (step S208). Then, the forwarder 13A adds the forwarding information generated by the forwarding information generator 14A to the message received in step S201, and forwards the added message to the destination client terminal device (step S209).

Also, when the forwarding information is contained in the message received in step S201 (step S203: Yes), the forwarder 13A specifies the communication connection (communication socket) of the destination client terminal device from this forwarding information, and writes the message received in step S201 as it is to this communication socket thereby to forward the message to the destination client terminal device (step S209).

At this time, in some cases, the communication connection established between the communication device 10A and the destination client terminal device is interrupted by, for example, a network device or the like on the network 40, and this interruption of the communication connection is not recognized by the communication device 10A. In such a case, even when the communication device 10A performs processing of forwarding the message, the message is not forwarded to the destination client terminal device. To address this concern, the forwarder 13A determines whether or not the message was able to be successfully forwarded, after the message was forwarded to the destination client terminal device in step S209 (step S210). Then, when the message was not able to be successfully forwarded to the destination client terminal device (step S210: No), an error indicating that the message was not able to be forwarded is sent as a notice to the client terminal device (step S207). On the other hand, when the message was able to be successfully forwarded to the destination client terminal device (step S210: Yes), the processing directly ends.

As described above, the communication device 10A according to the present embodiment forwards the message based on the forwarding information contained in the message that is transmitted and received between the terminal device 20 and the terminal device 30. Therefore, once the forwarding information generator 14A generates the forwarding information, the message can be forwarded only by specifying the communication connection with the destination client terminal device from the forwarding information contained in the message to be forwarded, and writing the message to the communication connection. Thus, the delay when forwarding the message can be reduced.

That is, in the related art, the communication device forwarding the message accesses the main storage to specify the communication connection with the destination client every time the message is forwarded. Therefore, the access to the main storage and the exclusive control needed to be performed every time the message is forwarded, thereby causing delay. In contrast, according to the present embodiment, after the forwarding information is generated, the message can be forwarded without accessing the main storage. Thus, the delay when forwarding the message can be reduced.

Second Embodiment

Next, the second embodiment will be described. In the first embodiment described above, the forwarding information is generated when the message is firstly transmitted from the terminal device 20 to the terminal device 30. On the other hand, in the second embodiment, the forwarding information is generated when the communication connection is established with the terminal device 20 in response to the connection establishment request from the terminal device 20. Hereinafter, only portions characteristic of the present embodiment will be described while appropriately omitting redundant description of the constituents common to those in the first embodiment with the same reference numerals assigned.

Figure 6:
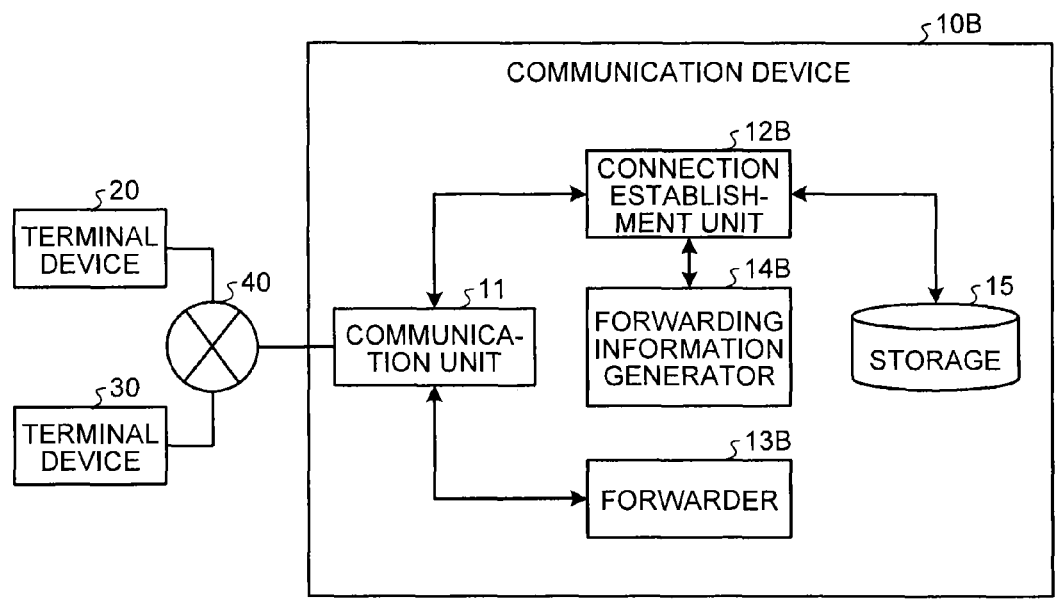
FIG. 6 is a configuration diagram illustrating a communication device according to a second embodiment.

FIG. 6 is a configuration diagram illustrating a communication device 10B according to the second embodiment. The communication device 10B includes, as illustrated in FIG. 6, a communication unit 11, a connection establishment unit 12B, a forwarder 13B, a forwarding information generator 14B, and a storage 15. The communication unit 11 and the storage 15 are similar to those in the first embodiment.

The connection establishment unit 12B establishes, in a similar manner to the connection establishment unit 12A of the first embodiment, the communication connection with the terminal devices 20 and 30 in response to the connection establishment request from the terminal devices 20 and 30, and registers a pair of the terminal identification information and the terminal connection information to the entry of the connection management table T1 retained by the storage 15. At this time, in response to the receipt of the connection establishment request containing the terminal identification information of the terminal device 20 and the terminal identification information of the terminal device 30 from the terminal device 20, the connection establishment unit 12B of the communication device 10B establishes the communication connection with the terminal device 20 while requesting the generation of the forwarding information to the forwarding information generator 14B.

For example, the connection establishment unit 12B searches the entry of the connection management table T1 retained by the storage 15 using the terminal identification information of the terminal device 30 contained in the connection establishment request from the terminal device 20 as a key, and obtains the terminal connection information corresponding to the terminal identification information of the terminal device 30. Then, the connection establishment unit 12B delivers the terminal connection information obtained by the establishment of the communication connection with the terminal device 20 and the terminal connection information of the terminal device 30 obtained from the storage 15, to the forwarding information generator 14B, and requests generation of the forwarding information.

The forwarding information generator 14B is called in response to the request from the connection establishment unit 12B, and generates the above-described forwarding information containing the terminal connection information of each of the terminal devices 20 and 30 that transmit and receive the message. Then, the forwarding information generator 14B notifies the terminal device 20 of the generated forwarding information. This enables the terminal device 20 to transmit the message containing the forwarding information even when transmitting the transmission message to the terminal device 30 for the first time.

It is noted that in the above description, the connection establishment unit 12B obtains the terminal connection information of the terminal device 30 from the storage 15 based on the terminal identification information of the terminal device 30 contained in the connection establishment request from the terminal device 20, and delivers the terminal connection information of the terminal device 20 and the terminal connection information of the terminal device 30 to the forwarding information generator 14B, to request generation of the forwarding information. However, it may be configured that the connection establishment unit 12B delivers the terminal connection information or the terminal identification information of the terminal device 20 and the terminal identification information of the terminal device 30 to the forwarding information generator 14B, to request generation of the forwarding information, and then the forwarding information generator 14B obtains the terminal connection information of the terminal device 30 from the storage 15, to generate the forwarding information.

The forwarder 13B receives the message transmitted from one of the terminal devices 20 and 30 to the other, and forwards the message to the destination client terminal device based on the forwarding information contained in the received message. In the present embodiment, since the forwarding information is generated before the message is transmitted and received between the terminal devices 20 and 30 as described above, the message containing the forwarding information is transmitted and received even when transmitting the message for the first time. Accordingly, the forwarder 13B does not need to check whether or not the forwarding information is contained in the message, like the forwarder 13A according to the first embodiment. The forwarder 13B can forward the message only by specifying the communication connection (communication socket) of the destination client from the forwarding information contained in the received message, and writing the message to the specified communication connection.

Figure 7:
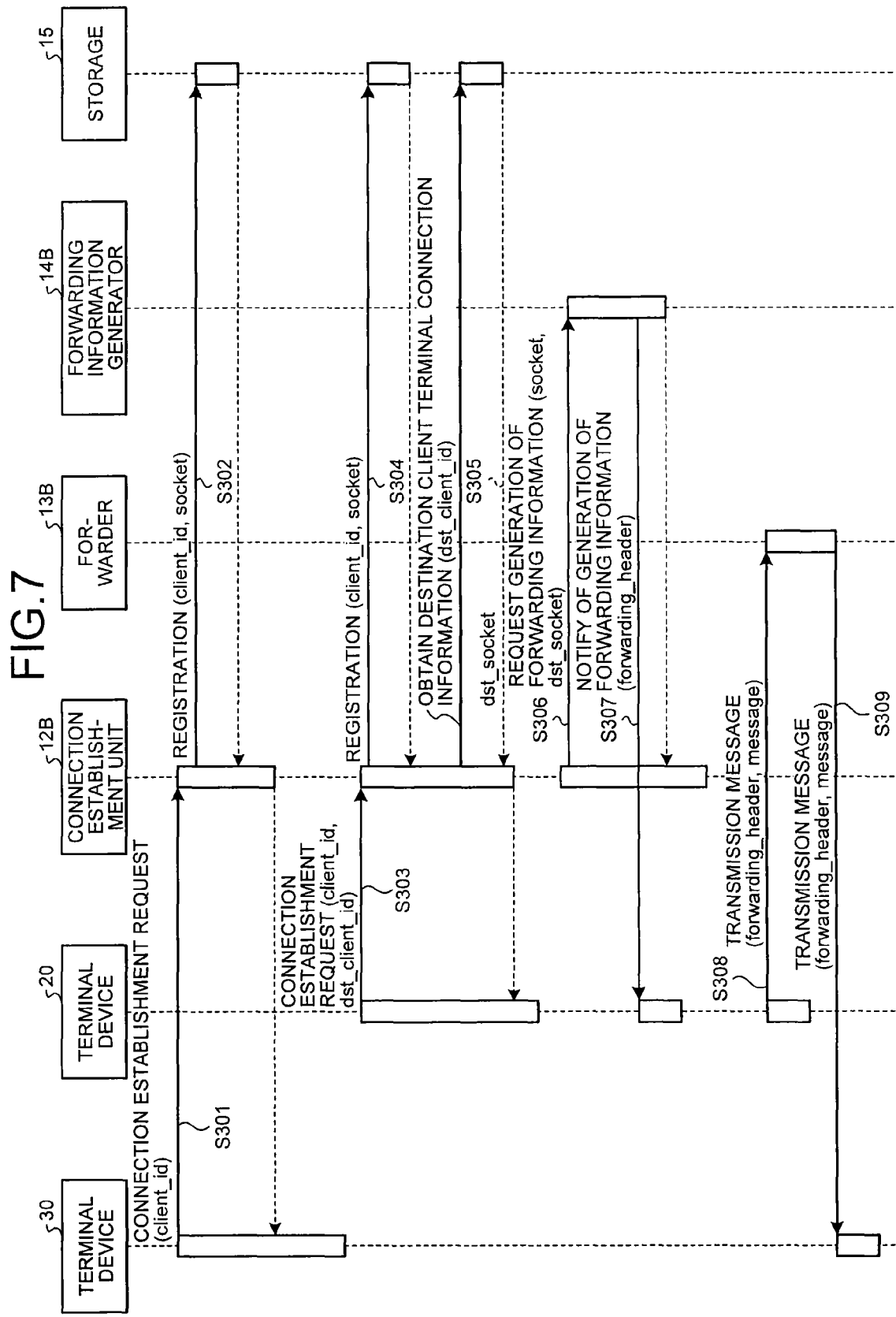
FIG. 7 is a sequence diagram illustrating an action of a communication device according to the second embodiment.

Next, referring to FIG. 7, an action of the communication device 10B according to the second embodiment will be described. FIG. 7 is a sequence diagram illustrating an action of the communication device 10B according to the second embodiment. In the drawing, "client_id" indicates the terminal identification information; "socket" indicates the terminal connection information; and "forwarding_header" indicates the forwarding information. Also, "dst_" indicates the destination client. It is noted that in FIG. 7, the application of smart remote control is assumed in which a control command is transmitted from the terminal device 20 (a smart phone) to the terminal device 30 (a digital TV set) as a message.

First, a connection establishment request is transmitted from the terminal device 30 (a digital TV set) to the communication device 10B (step S301). This connection establishment request contains the terminal identification information (client_id) of the terminal device 30.

The connection establishment unit 12B of the communication device 10B receives the connection establishment request from the terminal device 30, establishes the communication connection with the terminal device 30 in response to this connection establishment request, and registers a pair of the terminal identification information (client_id) contained in the connection establishment request and the terminal connection information (socket) indicating the communication connection established with the terminal device 30, to an entry of the connection management table T1 retained by the storage 15 (step S302).

Next, a connection establishment request is transmitted from the terminal device 20 (a smart phone) to the communication device 10B (step S303). This connection establishment request contains the terminal identification information (client_id) of the terminal device 20, and the terminal identification information (dst_client_id) of the terminal device 30 designated by the terminal device 20 as a client destination of the message.

The connection establishment unit 12B of the communication device 10B receives the connection establishment request from the terminal device 20, establishes communication connection with the terminal device 20 in response to this connection establishment request, and registers a pair of the terminal identification information (client_id) of the terminal device 20 contained in the connection establishment request and the terminal connection information (socket) indicating the communication connection established with the terminal device 20, to an entry of the connection management table T1 retained by the storage 15 (step S304). Also, at this time, the connection establishment unit 12B searches the entry of the connection management table T1 retained by the storage 15 using the terminal identification information (dst_client_id) of the terminal device 30 contained in the connection establishment request from the terminal device 20 as a key, and obtains the terminal connection information (dst_socket) corresponding to this terminal identification information (dst_client_id) (step S305).

Next, the connection establishment unit 12B delivers the terminal connection information (socket) of the terminal device 20 and the terminal connection information (dst_socket) of the terminal device 30 to the forwarding information generator 14B, to request generation of the forwarding information (forwarding_header) (step S306). In response to this request, the forwarding information generator 14B generates the forwarding information (forwarding_header) containing the terminal connection information (socket) of the terminal device 20 and the terminal connection information (dst_socket) of the terminal device 30, and notifies the terminal device 20 of the generated forwarding information (forwarding_header) (step S307).

Next, a transmission message to the terminal device 30 is transmitted from the terminal device 20 to the communication device 10B (step S308). This transmission message is, for example, a control command for manipulating the terminal device 30 (a digital TV set) from the terminal device 20 (a smart phone) by an application of smart remote control. This transmission message contains the forwarding information (forwarding_header).

In response to the receipt of the transmission message from the terminal device 20, the forwarder 13B of the communication device 10B specifies the communication connection (communication socket) of the terminal device 30 that is the destination client of the transmission message, based on the forwarding information (forwarding_header) contained in the relevant message. Then, the transmission message received from the terminal device 20 is written as it is to this communication socket, thereby to forward the transmission message to the terminal device 30 (step S309).

As described above, the communication device 10B according to the present embodiment forwards, similarly to the above-described communication device 10A according to the first embodiment, the message, based on the forwarding information contained in the message that is transmitted and received between the terminal device 20 and the terminal device 30. Accordingly, similarly to the communication device 10A according to the first embodiment, the main storage does not need to be accessed to specify the destination client every time the message is forwarded, thereby enabling the delay when forwarding the message to be reduced.

Third Embodiment

Next, the third embodiment will be described. The third embodiment is an example of disposing a connection adjusting device that assigns a communication device to be connected with the terminal devices 20 and 30, in a communication system including a plurality of the communication devices 10A according to the first embodiment or the communication devices 10B according to the second embodiment. It is noted that the communication devices included in the communication system according to the present embodiment will be expressed as communication devices 10 below. The terminal devices 20 and 30 are the same as those in the first embodiment and the second embodiment, except that they access the connection adjusting device to receive designation of the communication device 10 to be connected with, before performing the connection establishment request to the communication device 10. Hereinafter, only portions characteristic of the present embodiment will be described.

Figures 8, 9:
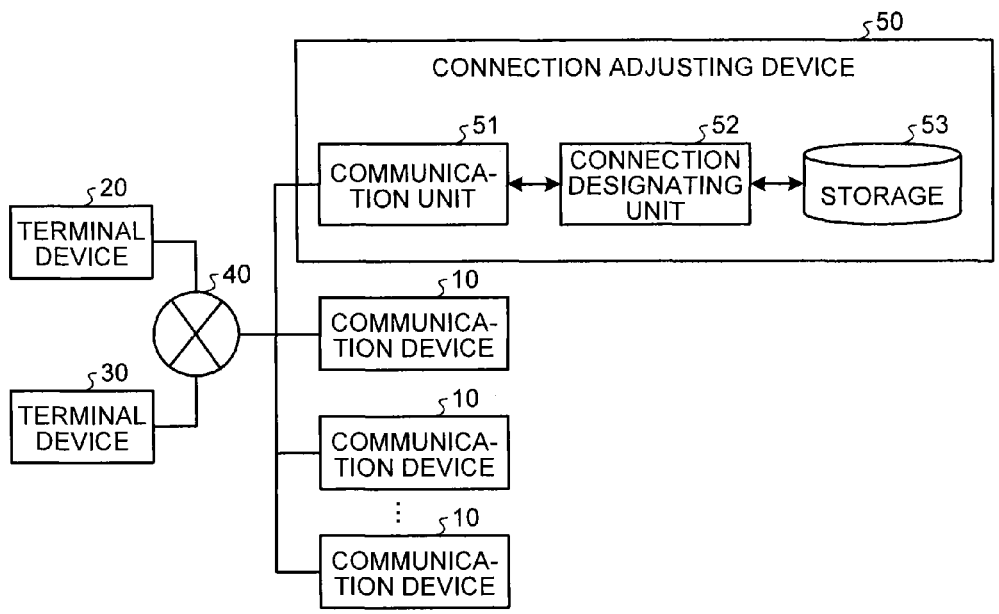
FIG. 8 is a configuration diagram illustrating a communication system according to a third embodiment.
FIG. 9 is a conceptual diagram illustrating an example of a terminal management table.

FIG. 8 is a configuration diagram illustrating a communication system according to the third embodiment. The communication system according to the present embodiment includes a connection adjusting device 50 that designates the communication device 10 to be connected with the terminal devices 2 and 30, among the plurality of communication devices 10.

The connection adjusting device 50 has a hardware configuration as a general computer similarly to the communication devices 10, and includes a communication unit 51, a connection designating unit 52 and a storage 53 as functional components, as illustrated in FIG. 8.

The communication unit 51 is similar to the communication unit 11 included in the communication device 10A according to the first embodiment and the communication device 10B according to the second embodiment.

The storage 53 retains a terminal management table T2 for managing terminal devices registered in the communication system according to the present embodiment. FIG. 9 is a conceptual diagram illustrating an example of the connection management table T2 retained by the storage 53. As illustrated in FIG. 9, the terminal identification information of the relevant terminal device, the communication device identification information that identifies the communication device 10 connected with the relevant terminal device, the group identification information that identifies a group of terminals capable of mutually communicating with the relevant terminal device, and the attribute information such as a model name of the relevant terminal device are associated with each other, and stored in each entry of the terminal management table T2, for each terminal device registered in the communication system according to the present embodiment.

The terminal identification information, the group identification information and the attribute information are stored in the entry of the terminal management table T2 when a user utilizing the communication system according to the present embodiment registers his or her own devices (the terminal devices 20 and 30). The communication device identification information is stored in the entry in which the terminal identification information of the terminal device 20 or 30 is stored, when the communication connection between the terminal device 20 or 30 and the communication device 10 is established. It is noted that the group identification information and the attribute information are not necessarily required, and at least the terminal identification information and the communication device identification information may be stored in the entry of the terminal management table T2 in such a manner as being associated with each other.

The group identification information is assumed to, but not limited to, be specifically achieved by an owner ID or the like. Alternatively, the group identification information may be configured as a list of devices capable of mutual communication or a list of devices incapable of mutual communication each retained in a similar manner to an ACL (Access Control List).

The terminal management table T2 may be constituted by one database table, but may also be constituted by a plurality of tables and a plurality of database. Also, the type of the database is not limited. A relational database may be used; a key-value store may be used; or a file realized in an original format may be used. Also, the terminal management table T2 may be non-volatilized, or may be retained in a memory. The implementation form of the terminal management table T2 is not limited.

The connection designating unit 52 designates, in response to the receipt of the connection request from the terminal devices 20 and 30, the communication device 10 to be connected with, among the plurality of communication devices 10 included in the communication system, based on the terminal management table T2 retained by the storage 53. That is, the connection designating unit 52 notifies the terminal devices 20 and 30 having transmitted the connection request to the connection adjusting device 50, of, for example, pair information of a URL or an IP address and a port number of the communication device 10 to be connected with, thereby to designate the connection to this communication device 10.

Specifically, with respect, to the connection request without the designation of the destination client terminal device, the connection designating unit 52 selects and designates the communication device 10 having a margin in the number of housing connections, among the plurality of communication devices 10 included in the communication system, in accordance with a certain rule or randomly. As the certain rule, the degree of the margin in the number of housing connections may be used (in this case, the connection adjusting device 50 includes a unit of collecting empty resources in the communication device 10. At the same time, the communication device 10 also includes a unit of providing the connection adjusting device 50 with the empty resources information); the attribute information contained in the connection request or in the terminal management table T2 retained by the storage 53 may be used (for example, an installation location (such as a country and a region)) of the terminal; or accumulated information of communication histories, frequency information and the like of the terminal devices 20 and 30 may be used. A conceivable example of the case lastly listed includes a use case of designating the connection to the communication device 10 having high response performance, for a smart phone that remotely manipulates a digital TV set at high frequency.

Also, with respect to the connection request that specifies the destination client terminal device, the connection designating unit 52 designates to send an error response when the destination client terminal device is not yet connected with the communication device 10, and to connect with the destination client communication device 10 when the destination client terminal device is connected with any of the communication devices 10. Also, when the connection with the communication device 10 to be connected with the destination client terminal device is not permitted, an error response is sent.

In the communication system according to the present embodiment, the terminal devices 20 and 30 transmit the connection request to the connection adjusting device 50 before performing the connection establishment request to the communication device 10. Then, the terminal devices 20 and 30 receive connection designation information (such as pair information of a URL or an IP address and a port number of the communication device 10 to be connected with) that is transmitted (as a notice) from the connection adjusting device 50 in response to this connection request, and then transmit the connection establishment request to the communication device 10 designated by the connection adjusting device 50 based on the received connection designation information. The action thereafter is similar to that in the first embodiment or the second embodiment described above.

As described above, in the communication system according to the present embodiment, the system configuration including the plurality of communication devices 10 enables elimination of the delay factor described in the first embodiment or the second embodiment to be also developed in a larger system that houses a plurality of terminal devices.

It is noted that the functional components of the communication device 10A according to the first embodiment, the communication device 10B according to the second embodiment and the connection adjusting device 50 according to the third embodiment described above can be achieved by, for example, a program (software) that is executed using a general-purpose computer system as basic hardware.

Figure 10:
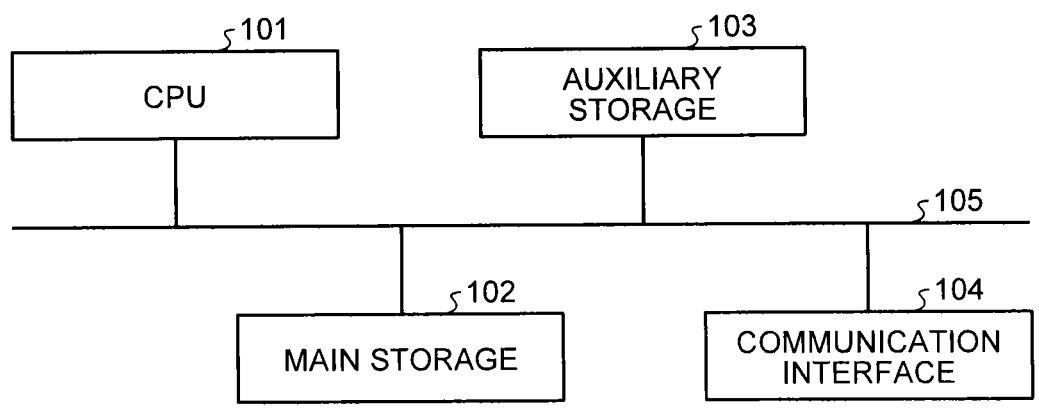
FIG. 10 is a diagram illustrating an example of a hardware configuration of a communication device and a connection adjusting device.

FIG. 10 is a diagram illustrating an example of the hardware configuration of the communication devices 10A and 10B and the connection adjusting device 50. The communication devices 10A and 10B and the connection adjusting device 50 each are constituted, as illustrated in FIG. 10, as a general-purpose computer system including a CPU 101, a main storage 102, an auxiliary storage 103, a communication interface 104, and a bus 105 that connects each unit. It is noted that the auxiliary storage 103 may be connected with each unit via a wired or wireless LAN (Local Area Network) or the like.

The functional components of the communication devices 10A and 10B and the connection adjusting device 50 are achieved by, for example, the CPU 101 that executes a program stored in the auxiliary storage 103 or the like utilizing the main storage 102. This program is provided as a computer program product by being stored in, for example, a magnetic disk (such as a flexible disk and a hard disk), an optical disk (such as a CD-ROM, a CD-R, a CD-RW, a DVD-ROM, a DVD±R, a DVD±RW and a Blu-ray (registered trademark) Disc), a semiconductor memory, or a storage medium similar to these. The storage medium that storages a program may have a storage format in any form, as long as it is readable by the computer system.

Also, the above-described program may be achieved by being previously installed in a computer system, or it may be configured that the above-described program distributed via a network is appropriately installed in a computer system. Also, it may be configured that the above-described program is executed in an external server computer, and a result thereof is received via a network by the communication devices 10A and 10B and the connection adjusting device 50 constituted as client computers.

The above-described program to be executed in a computer system has a module structure containing the above-described functional components of the communication devices 10A and 10B and the connection adjusting device 50. The CPU 101 appropriately calls and executes this program, so that the above-described functional components of the communication devices 10A and 10B and the connection adjusting device 50 are uploaded in the main storage 102 and generated in the main storage 102.

It is noted that not only the above-described functional components of the communication devices 10A and 10B and the connection adjusting device 50 are achieved by a program (software), but also a portion or all of the functional components can be achieved by dedicated hardware such as an ASIC (Application Specific Integrated Circuit) and an FPGA (Field-Programmable Gate Array).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that communicates with a plurality of terminal devices, including a first terminal device and a second terminal device, via a network, the communication device comprising:

processing circuitry coupled to a memory, wherein the processing circuitry is configured to:

receive, from the first terminal device, a connection establishment request containing at least terminal identification information of the first terminal device;

establish a communication connection with the first terminal device, the communication connection established with the first terminal device being maintained absent an explicit operation of interrupting the communication connection;

store the terminal identification information of the first terminal device and first terminal connection information indicating the communication connection established with the first terminal device so that the terminal identification information of the first terminal device and the first terminal connection information are associated with each other;

receive, from the second terminal device, a connection establishment request containing at least terminal identification information of the second terminal device;

establish a communication connection with the second terminal device, the communication connection established with the second terminal device being maintained absent an explicit operation of interrupting the communication connection;

store the terminal identification information of the second terminal device and second terminal connection information indicating the communication connection established with the second terminal device so that the terminal identification information of the second terminal device and the second terminal connection information are associated with each other;

generate forwarding information containing the first terminal connection information and the second terminal connection information;

receive, from the first terminal device, a message to be transmitted from the first terminal device to the second terminal device using the communication connection established with the first terminal device;

specify the communication connection established with the second terminal device based on the forwarding information contained in the received message; and forward the received message containing the forwarding information to the second terminal device using the specified communication connection.

2. The communication device according to claim 1, wherein the processing circuitry is configured to, when the forwarding information is not contained in the message received from the first terminal device, add the generated forwarding information to the message and forward the added message to the second terminal device.

3. The communication device according to claim 1, wherein the processing circuitry is configured to, when receiving, from the first terminal device, the connection establishment request containing the terminal identification information of the first terminal device and the terminal identification information of the second terminal device, generate the forwarding information based on the terminal identification information of the first terminal device and the terminal identification information of the second terminal device contained in the connection establishment request and notify the first terminal device of the forwarding information using the communication connection established with the first terminal device.

4. A communication system comprising:
a plurality of communication devices each communicating with a plurality of terminal devices via a network; and
a connection adjusting device, wherein
each of the plurality of communication devices is the communication device according to claim 1,
the connection adjusting device is configured to generate connection designation information for designating the communication device with which the terminal devices are to establish a communication connection, among the plurality of communication devices, and
each of the plurality of terminal devices is configured to transmit a connection request to the connection adjusting device, and transmit, based on the connection designation information received from the connection adjusting device in response to the connection request, the connection establishment request to the designated communication device.

5. The communication device according to claim 1, wherein each of the communication connection established with the first terminal device and the communication connection established with the second terminal device is a communication socket established by utilizing a Web Socket protocol.

6. The communication device according to claim 5, wherein each of the first terminal connection information and the second terminal connection information is a communication socket ID that is a file descriptor for allowing a file system of the communication device to access the communication socket.

7. The communication device according to claim 5, wherein
the received message includes a Websocket header and a payload, and
the forwarding information is contained in the payload.

8. A communication method to be executed in a communication device that communicates with a plurality of terminal devices, including a first terminal device and a second terminal device, via a network, the method comprising:
receiving, from the first terminal device, a connection establishment request containing at least terminal identification information of the first terminal device;
establishing a communication connection with the first terminal device, the communication connection established with the first terminal device being maintained absent an explicit operation of interrupting the communication connection;
storing the terminal identification information of the first terminal device and first terminal connection information indicating the communication connection established with the first terminal device so that the terminal identification information of the first terminal device and the first terminal connection information are associated with each other;
receiving, from the second terminal device, a connection establishment request containing at least terminal identification information of the second terminal device;
establishing a communication connection with the second terminal device, the communication connection established with the second terminal device being maintained absent an explicit operation of interrupting the communication connection;
storing the terminal identification information of the second terminal device and second terminal connection information indicating the communication connection established with the second terminal device so that the terminal identification information of the second terminal device and the second terminal connection information are associated with each other;
generating forwarding information containing the first terminal connection information and the second terminal connection information;
receiving, from the first terminal device, a message to be transmitted from the first terminal device to the second terminal device using the communication connection established with the first terminal device;
specifying the communication connection established with the second terminal device based on the forwarding information contained in the received message; and
forwarding the received message containing the forwarding information to the second terminal device using the specified communication connection.

9. A computer program product comprising a non-transitory computer-readable medium containing a program executed by a computer that communicates with a plurality of terminal devices, including a first terminal device and a second terminal device, via a network, the program causing the computer to execute:

receiving, from the first terminal device, a connection establishment request containing at least terminal identification information of the first terminal device;

establishing a communication connection with the first terminal device, the communication connection established with the first terminal device being maintained absent an explicit operation of interrupting the communication connection;

storing the terminal identification information of the first terminal device and first terminal connection information indicating the communication connection established with the first terminal device so that the terminal identification information of the first terminal device and the first terminal connection information are associated with each other;

receiving, from the second terminal device, a connection establishment request containing at least terminal identification information of the second terminal device;

establishing a communication connection with the second terminal device, the communication connection established with the second terminal device being maintained absent an explicit operation of interrupting the communication connection;

storing the terminal identification information of the second terminal device and second terminal connection information indicating the communication connection established with the second terminal device so that the terminal identification information of the second terminal device and the second terminal connection information are associated with each other;

generating forwarding information containing the first terminal connection information and the second terminal connection information;

receiving, from the first terminal device, a message to be transmitted from the first terminal device to the second terminal device using the communication connection established with the first terminal device;

specifying the communication connection established with the second terminal device based on the forwarding information contained in the received message; and forwarding the received message containing the forwarding information to the second terminal device using the specified communication connection.

\* \* \* \* \*